United States Patent [19]

Sekmakas et al.

[11] Patent Number: 4,461,857

[45] Date of Patent: Jul. 24, 1984

[54] THERMOSETTING AQUEOUS COATING COMPOSITIONS CONTAINING EPOXY-PHOSPHATE DISPERSIONS

[75] Inventors: Kazys Sekmakas, Palatine; Raj Shah, Schaumburg, both of Ill.

[73] Assignee: DeSoto, Inc., Des Plaines, Ill.

[21] Appl. No.: 547,231

[22] Filed: Oct. 31, 1983

Related U.S. Application Data

[63] Continuation-in-part of Ser. No. 428,275, Sep. 29, 1982, Pat. No. 4,425,451.

[51] Int. Cl.$^3$ .................. C08G 59/14; C08L 63/00
[52] U.S. Cl. ................... 523/414; 523/402; 523/417; 523/424; 523/426; 528/89; 528/109; 528/398
[58] Field of Search .............. 523/414, 402, 424, 426, 523/417; 528/89, 109, 398

[56] References Cited

U.S. PATENT DOCUMENTS

| | | | |
|---|---|---|---|
| 2,732,367 | 1/1956 | Shokal | 528/108 |
| 4,145,323 | 3/1979 | Sekmakas et al. | 523/402 |
| 4,256,844 | 3/1981 | Martin et al. | 528/108 |
| 4,316,922 | 2/1982 | Perine et al. | 523/414 |

*Primary Examiner*—Ronald W. Griffin
*Attorney, Agent, or Firm*—Dressler, Goldsmith, Shore, Sutker & Milnamow, Ltd.

[57] ABSTRACT

Aqueous thermosetting coating compositions are disclosed characterized by reduced curing requirements and which produce coatings having superior cured properties. These coatings comprise water containing water miscible organic solvent and the compositions have dispersed therein, based on total resin solids, from 25% to 85% of carboxy-functional organic solvent-soluble copolymer salt with a volatile amine in which the copolymer contains hydroxy groups providing an hydroxyl value in the range of 30 to 300, from 5% to 40% of a water soluble or water dispersible aminoplast or phenoplast curing agent, and from 2% to 35%, of a water dispersible epoxy phosphate ester polymer which is an oxirane-function-free, salt reaction product of (1) a monoester reaction product containing residual epoxy functionality, of (a) a resinous polyepoxide having at least about 1.4 oxirane groups per molecule, and (b) less than 0.9 mole of orthophosphoric acid for each oxirane equivalent in the polyepoxide, with (2) at least 1 mole of a volatile amine per equivalent of oxirane functionality in the monoester.

9 Claims, No Drawings

THERMOSETTING AQUEOUS COATING COMPOSITIONS CONTAINING EPOXY-PHOSPHATE DISPERSIONS

DESCRIPTION

This application is a continuation-in-part of our prior application Ser. No. 428,275 filed Sept. 29, 1982, now U.S. Pat. No. 4,425,451, issued Jan. 10, 1984.

TECHNICAL FIELD

This invention relates to aqueous thermosetting coating compositions containing dispersed solvent-soluble copolymers which contain hydroxy and carboxy groups in combination with a water soluble or water dispersible aminoplast or phenoplast curing agent. The objective is to improve the cure and the properties of the cured coatings.

BACKGROUND ART

Aqueous coating systems in which carboxy-functional copolymers containing hydroxy groups are dispersed in water with the aid of water miscible organic solvent and a volatile amine and cured by the presence of a water soluble or water dispersible aminoplast or phenoplast curing agent are known and have various uses. Thus, they may be used directly as coatings (applied by spray roller, etc.) or they may be diluted and electrodeposited at the anode of a unidirectional electrical system. It is desired to speed the cure and/or lower curing temperature. It is also desired to improve the properties of the cured coatings, such as salt spray resistance, detergent resistance, abrasion resistance, hardness and adhesion to various substrates (especially untreated steel and aluminum).

DISCLOSURE OF INVENTION

In accordance with this invention, it has been found that the cure of thermosetting aqueous coatings in which carboxy-functional copolymers containing hydroxy groups are dispersed in water with the aid of water miscible organic solvent and a volatile amine and cured by the presence of a water soluble or water dispersible aminoplast or phenoplast curing agent, is improved and the properties of the cured coatings are improved when we incorporate from 2% to 35%, preferably from 10% to 30%, based on total resin solids, of the water dispersible epoxy phosphate described in our said prior application.

The copolymers are solvent soluble copolymers of monethylenically unsaturated monomers including carboxy-functional monomer providing carboxy groups which enable dispersion in water and hydroxy functional material providing hydroxy functionality for cure. The bulk of the polymer is provided by nonreactive monomers like styrene, vinyl toluene, methyl methacrylate, and the like. Copolymerization in organic solvent solution is preferred to provide copolymers having an hydroxyl value in the range of 30 to 300, preferably from 50 to 150, and an acid number of at least about 10. Acid numbers of 12 to 60 are preferred for electrodeposition, but higher acid number, from about 30 to about 200, are preferred for ordinary coating application. This copolymer provides from 25% to 85%, preferably from 50% to 70% of total resin solids.

The carboxy functional monomers are illustrated by acrylic and methacrylic acids, though the entire class of monoethylenic monomers carrying one or more carboxy groups can be used, such as monobutyl maleate and maleic acid.

Hydroxy functionality may be introduced using monomeric or polymeric materials or by generating it after polymerization. The useful monomers are illustrated by 2-hydroxyethyl acrylate and 2-hydroxy propyl methacrylate, though other monomers carrying one or more hydroxy groups can be used, such as allyl or methallyl alcohol. It is also possible to react a portion of the carboxy functionality provided by the carboxy functional monomer with a monoepoxide to generate the hydroxy monomer after the copolymer has been formed. Suitable monoepoxides are 1,2-propylene oxide, 1,2-butylene oxide, epoxy olefins obtained by epoxidizing a $C_{12}$–$C_{16}$ olefin, and epoxy esters, such as the commercial product Cardura E.

When hydroxy functional polymeric materials are used, one may employ epoxy ethers and esters. It has been found that ethers of oleyl alcohol with a diglycidyl ether of a bisphenol, such as bisphenol A, to consume all the epoxy functionality provides an hydroxy functional diether which copolymerizes well with the other monomers used to provide a copolymer which is particularly useful for anodic electrocoating.

The aminoplast and phenoplast curing agents may be water soluble or water dispersible and are themselves well known and commonly used for the curing of reactive copolymers of the type under consideration. These are used in an amount of from 5% to 40%, preferably from 10% to 35%,, based on total resin solids. Aminoplast resins are preferred, such as hexamethyoxymethyl melamine. Urea-formaldehyde condensates and benzoguanamine-formaldehyde condensates are also useful. Useful phenoplast resins are illustrated by a phenol-formaldehyde A-stage resol, and also by water insoluble heat-hardening phenolic resins which are dispersible in the copolymer dispersions under consideration.

The water dispersible epoxy phosphates which are used herein are described in our said prior application. These epoxy-phosphates are ester polymers which are oxirane-function-free, salt reaction products of (1) a monoester reaction product containing residual epoxy functionality, of (a) a resinous polyepoxide having at least about 1.4 oxirane groups per molecule and (b) less than 0.9 mol or orthophosphoric acid for each oxirane equivalent in the polyepoxide, with (2) at least 1 mol of a volatile amine per equivalent of oxirane functionality in the monoester. In preferred practice, from 0.1 to 0.7, most preferably 0.2 to 0.5, mole of orthophosphoric acid is used for each oxirane equivalent in the polyepoxide, and at least 2 mols of amine are used per mol of available oxirane functionality in the monoester.

It is essential to employ the specified large proportion of amine to destroy the unreacted oxirane functionality. If any significant proportion of oxirane functionality is left unreacted, this functionality creates a lack of stability in the highly reactive thermosetting aqueous compositions under consideration. This causes the oxirane-containing epoxy phosphate to destabilize the entire system. As a result of this instability, the aqueous compositions change viscosity and curing characteristics with time, and thus become unpredictable in performance. Also, seeds tend to form in the aqueous dispersion and this can cause settling. These difficulties prevent industrial use, especially in electrocoating systems where long term bath stability is essential to a practical operating system.

Water miscible organic solvents are well known to assist in the dispersibility of carboxy-functional copolymers, and they are also useful in providing superior epoxy phosphate compositions, the preferred solvent in this respect being 2-butoxy ethanol. Appropriate solvents are shown in the examples.

All proportions herein and in the accompanying claims are by weight, unless otherwise specified.

While any organic polyepoxide may be used to provide the epoxy phosphates used herein, it is preferred to employ diepoxides having a 1,2-epoxy equivalency not in excess of about 2.0. Diglycidyl ethers of a bisphenol are particularly preferred, especially those having a 1,2-epoxy equivalency of 1.5–2.0 and an average molecular weight (determined by calculation) in the range of 350 to 8000, preferably 2000 to 5000.

The term "a bisphenol" is known to describe compounds of the formula:

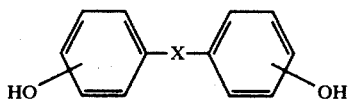

in which X is a straight chain or branched chain divalent aliphatic radical of from 1 to 3 carbon atoms, or $>SO_2$, $>SO$, or $-O-$.

The preferred bisphenol is bisphenol A in which X is 2,2 propylidene and the two OH groups are in the para position. Other bisphenols are illustrated by 4,4'-thiodiphenol and 4,4'-sulfonyl diphenol.

The invention will be illustrated using a preferred diglycidyl ether of bisphenol A having an average molecular weight of about 4500.

It is not necessary that all of the stoichiometric deficiency of acid be orthosphosphoric acid so long as at least 0.1 mole of orthophosphoric acid is used for each oxirane equivalent in the polyepoxide. Carboxylic acids, such as acetic acid or dimethylol propionic acid, can be used in place of a portion of the orthorphosphoric acid. At least 10%, preferably 30% to 80%, of the initial oxirane groups should be preserved for subsequent reaction with amine.

The volatile amines which are used herein for salt formation are well known for this purpose. Dimethyl ethanol amine is preferred and will be used herein as illustrative, but many other amines are also useful. Thus, other amine, such as triethyl amine, and mono-, di-, or triethanol amines are all useful. Ammonia is commonly considered a volatile amine for the purpose at hand, but it is less preferred because its use produces lower solids content and requires a greater proportion of water miscible organic solvent. The same amines are used for salt formation with the carboxy groups in the copolymer to enable dispersion of the copolymer in water.

The amine must be volatile since it is desired to remove as much of the amine as possible from the applied coatings by baking the same to provoke the desired cure.

The need for water miscible organic solvents has previously been discussed. It is here pointed out that the final water dispersions will contain both organic solvent and water in a weight ratio of 5:95 to 50:50, preferably from 20:80 to 35:65.

To consider the total resin solids content of the aqueous dispersions of this invention, it has previously been pointed out that the epoxy phosphate is to constitute from 2% to 35% of the solids, the copolymer is to constitute from 25% to 85% of the solids, and the curing agent is to constitute from 5% to 40% of the solids. Other resin solids may be present in small amount, the only notable exception to this being the optional presence of a polyol which may be present to provide a portion of the hydroxy functionality, especially when the proportion of copolymer in the mixture is less than about 40%. This polyol must have a molecular weight of at least about 300 to minimize its volatility, and it may be either a polether or a polyester.

These polyols (polyhydric alcohols) form a known class of compounds which are illustrated particularly by polyethers formed by adducting ethylene, 1,2-propylene oxide or 1,2-butylene oxide, with a polyhydric alcohol, such as trimethylol propane or ethylene glycol. The base on which the oxides are adducted may even be aromatic, such as the water dispersible polyol made by adducting 6 moles of ethylene oxide onto 1 mole of bisphenol A. Polyesters can also provide useful polyhydric alcohols when they are dispersible in water. Water dispersible polyesters are illustrated by the adduct of ethylene glycol with sufficient epsilon caprolactone to provide a molecular weight of 500. Carboxy groups may be also be present in the polyester and provide the desired water dispersibility by salt formation with a volatile amine. A polyester of this character can be provided by polyesterifying one mole of trimethylol propane with one mole of succinic acid, and then adducting with enough succinic anhydride to produce carboxy groups providing an acid value of 50 Except for carboxy groups in the polyhydric alcohol, no other reactive group should be present.

The polyhydric alcohols will be illustrated using a triol adduct of trimethylol propane with 1,2-propylene oxide to provide an adduct of average molecular weight 400. A commerical product of this type is the Wyandotte product Pluracol TP-440.

The invention is illustrated in the examples which follow:

EXAMPLE 1

Preparation of Epoxy Ether Intermediate

| Parts | Component |
|-------|-----------|
| 1500  | Diglycidyl ether of bisphenol A having an average molecular weight of 1,000 and an epoxide equivalent weight of 500. The commercial material Epon 1001 (Shell) can be used. |
| 500   | Methyl ethyl ketone |
| 810   | Oleyl alcohol having an equivalent weight of 300. The commercial product ADOL 32 (Ashland Oil. Inc.) having an iodine value of 75–85 and an hydroxyl value of 205–225 can be used. |

EXAMPLE 2

49.6% of the epoxy ether of Example 1, 42.2% styrene, and 8.2% acrylic acid are copolymerized at 75% solids in 2-butoxy ethanol and then diluted to 64% solids with isopropanol. The product was a clear solution having a Gardner-Holdt viscosity of $Z_4-Z_5$ and a Gardner color of 1–2.

EXAMPLE 3 (CONTROL)

The copolymer solution of Example 2 was formulated into an electrocoating bath by mixing the 64% solution of that example with benzoguanamine-formaldehyde resin (100% solids) [XM 1123 from American Cyanamid may be used] to provide a mixture containing 80 parts of copolymer solids to 20 parts of benzoguanamine-formaldehyde resin. Dimethyl ethanol amine is then added to neutralize 100% of the acidity in the copolymer and the neutralized solution is diluted with deionized water to 10% solids and electrodeposited on zinc phosphate-treated steel panels at 100 volts and at 150 volts. The coated panels were rinsed with deionized water and baked for 20 minutes at 425° F.

The coating deposited at 100 volts had a thickness of 0.5 mil and at 150 volts, the thickness was 0.78 mil. These coatings resisted the water wash and the cure provided by the specified bake provided very good properties, albeit one always desires to make the coatings better. Also, while adhesion was good to the treated steel, when untreated steel is used in place of the treated steel, adhesion is poor.

EXAMPLE 4

Example 3 is repeated except that 10% of an epoxy phosphate was incorporated using the dispersion described in Example 5. As a result of the addition, the baking temperature could be reduced to 400° F. while still obtaining a full cure in the 20 minute baking period specified. At the same time, the salt spray resistance and the detergent resistance was improved, the cured coatings were slightly harder and more abrasion resistant. Also, adhesion was now obtainable when the coatings were electrodeposited upon untreated steel, where previously one had to employ a treated steel.

EXAMPLE 5

914 parts of a diglycidyl ether of bisphenol A having an average molecular weight of about 4500 and a 1,2-epoxy equivalency of about 2.0 (Shell Chemical Company product Epon 1007 may be used) are charged to a flask equipped with an ddition funnel, thermometer and a reflux condenser. 440 parts of 2-butoxy ethanol are also charged to the flask and heat is applied to heat the charge to 125° C. which is maintained until the polyepoxide is dissolved in the solvent.

24 parts of 85% orthophosphoric acid (in water) are premixed with 100 parts of 2-butoxy ethanol and the premixture is added from the addition funnel to the reactor over a 30 minute period with rapid agitation while holding the temperature at 125° C. This temperature is then maintained for 2 hours, and the contents of the flask (a monoester) are allowed to cool top 80° C.

44 parts of dimethyl ethanol amine are then added to the flask at 80° C. over a period of 15 minutes and the 80° C. temperature is maintained for a further 30 minutes to insure complete reaction. 1900 parts of deionized water are then added dropwise with high speed agitation to provide a stable aqueous dispersion having a nonvolatile solids content of 28.6%, a viscosity of U-V on the Gardner-Holdt scale and which possesses a fine particle size in the moderate viscosity noted

EXAMPLE 6

Example 4 is repeated using a 5% addition of the triol adduct of trimethylol propane with 1,2-propylene oxide having an average molecular weight of 400. Corresponding results are obtained, but the deposited film was more flexible.

What is claimed is:

1. An aqueous thermosetting coating composition comprising water containing water miscible organic solvent and having dispersed therein, based on total resin solids, from 25% to 85% of carboxy-functional organic solvent-soluble copolymer salt with a volatile amine, said copolymer containing hydroxy groups providing an hydroxyl value in the range of 30 to 300, from 5% to 40% of a water soluble or water dispersible aminoplast or phenoplast curing agent, and from 2% to 35%, of a water dispersible epoxy phosphate ester polymer which is an oxirane-function-free, salt reaction product of (1) a monoester reaction product containing residual epoxy functionality, of (a) a resinous polyepoxide having at least about 1.4 oxirane groups per molecule, and (b) less than 0.9 mole of orthophosphoric acid for each oxirane equivalent in the polyepoxide, with (2) at least 1 mole of a volatile amine per equivalent of oxirane functionality in the monoester.

2. An aqueous thermosetting coating composition as recited in claim 1 in which said copolymers are produced by copolymerization in organic solvent solution to provide copolymers having an hydroxyl value in the range of from 50 to 150, and an acid number of at least about 10.

3. An aqueous thermosetting coating composition as recited in claim 1 in which said copolymers have an acid number of from 30 to 200.

4. An aqueous thermosetting coating composition as recited in claim 1 in which said copolymer provides 50% to 70% of total resin solids and has an hydroxyl value in the range of 50 to 150, and an acid number of from about 30 to about 200.

5. An aqueous thermosetting coating composition as recited in claim 4 in which said epoxy phosphate provides from 10% to 30% of total resin solids, and an aminoplast is used in an amount of from 10% to 35% of total resin solids.

6. An aqueous thermosetting coating composition as recited in claim 1 in which said hydroxy functionality is provided by the copolymerization of hydroxy functional monomer.

7. An aqueous thermosetting coating composition as recited in claim 1 in which said hydroxy functionality is provided by the copolymerization of an epoxy ether with oleyl alcohol.

8. An aqueous thermosetting coating composition as recited in claim 7 in which said epoxy ether is an epoxy ether of a diglycidyl ether of a bisphenol having a molecular weight of about 1,000.

9. An aqueous thermosetting coating composition comprising water containing water miscible organic solvent and having dispersed therein, based on total resin solids, from 50% to 70% of carboxy-functional organic solvent-soluble copolymer salt with a volatile amine, said copolymer containing hydroxy groups providing an hydroxyl value in the range of 50 to 150 and an acid number in the range of from about 30 to about 200, from 10% to 35% of a water soluble or water dispersible aminoplast curing agent, and from 10% to 30%, of a water dispersible epoxy phosphate ester polymer which is an oxirane-function-free, salt reaction product of (1) a monoester reaction product containing residual epoxy functionality, of (a) a resinous polyepoxide having a 1,2-epoxy equivalency of from 1.5 to 2.0, and (b) from 0.2–0.5 mole of orthophosphoric acid for each oxirane equivalent in the polyepoxide, with (2) at least 2 mole of a volatile amine per equivalent of oxirane functionality in the monoester, and said organic solvent and said water being present in a weight ratio of 5:95 to 50:50.

* * * * *